(12) United States Patent
Kremerman (10) Patent No.: US 10,661,197 B1
(45) Date of Patent: *May 26, 2020

(54) INTEGRATED DUAL STAGE TRAP WITH INVERTED CUP

(71) Applicant: Elliot Kremerman, Los Gatos, CA (US)

(72) Inventor: Elliot Kremerman, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/503,718

(22) Filed: Jul. 5, 2019

Related U.S. Application Data

(63) Continuation of application No. 16/003,225, filed on Jun. 8, 2018, now Pat. No. 10,376,811.

(51) Int. Cl.
*B01D 8/00* (2006.01)
*B01D 5/00* (2006.01)
*B01D 3/02* (2006.01)
*B01D 3/08* (2006.01)

(52) U.S. Cl.
CPC ............... *B01D 8/00* (2013.01); *B01D 3/02* (2013.01); *B01D 3/085* (2013.01); *B01D 5/006* (2013.01); *B01D 5/009* (2013.01); *B01D 5/0093* (2013.01)

(58) Field of Classification Search
CPC . B01D 3/02; B01D 8/00; B01D 5/006; B01D 5/0093; B01D 5/085; F04B 37/08
See application file for complete search history.

(56) References Cited

U.S. PATENT DOCUMENTS

| | | | | |
|---|---|---|---|---|
| 4,502,871 A | * | 3/1985 | Andersen | B01D 50/002 266/148 |
| 2014/0230461 A1 | * | 8/2014 | Takahashi | F04B 37/08 62/55.5 |
| 2014/0366562 A1 | * | 12/2014 | Oikawa | B01D 8/00 62/55.5 |
| 2017/0130738 A1 | * | 5/2017 | Schweizer | F25B 30/00 |

* cited by examiner

*Primary Examiner* — Brian M King
(74) *Attorney, Agent, or Firm* — Michael J. Feigin, Esq.; Feigin and Fridman LLC (57) ABSTRACT

A cold trap has multiple interior spaces formed within one unit such that a vacuum pump pulls only dry air and distillate substantially fully or fully condenses and drops out of the bottom of the device. Laminar flow through a side portal is converted into turbulent flow in a cooling region around a conical cold glass or other inert protrusion. The only other portal of the cooling region is a bottom portal such that though there is vacuum suction, vapors only exit through the bottom portal after condensing and falling through an outer section while dry air is pulled upwards to an upper vacuum portal.

15 Claims, 8 Drawing Sheets

INTEGRATED DUAL STAGE TRAP WITH INVERTED CUP

FIELD OF THE DISCLOSED TECHNOLOGY

The disclosed technology relates generally to distillation and, more specifically, to distillation equipment with multiple stage condensation.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. Distribution adapters, also referred to as "cows" due to their appearance which is similar to a cow udder, typically have a centered female joint. The discharge ports ("udders") are either "pushed out" or are pointing downward with three or four typical discharge ports. These other ports offer a traveling pathway for a vacuum (typically used in the distribution adapter) to cause unintentional evaporation of compounds that have a lower boiling point or resilience against a vacuum. This causes partial contamination and depletion of a vacuum.

Further, when distilling multiple fractions (a fraction having a distinct boiling point or range of boiling points within a tolerance level of the distinct boiling point), one typically turns a prior art cow so that the next fraction extends into the next discharge port, which now becomes the lowest port ("lowest" meaning "closest to the surface of the Earth" or "closest to a vector direction in which gravity is pulling"). Those fractions with more energy (e.g. higher boiling point) are distilled later, in a subsequent port, compared to those with less energy. The problem with this method is that the smell of one fraction and it's vapors which have not fully condensed end up in the next fraction, contaminating this next fraction in any or multiple of smell, taste, color, and product.

A general problem with all distribution collection adapters is that even when three ports which are present to receive distillate product evacuated from a distillation head, any condensation or discharge from collected volatile vapors drip as a solid phase solution along the side of the collection assembly itself, and directly drip back into the collection flask. This is the traditional method that has become a customary problem with glassware. As a result, the distillate product becomes contaminated or is less pure than the ideal. Even when using one port, as in U.S. Pat. No. 9,895,627 issued to the same inventor, one must change the distribution head or cow with each fraction which, while a large improvement over the three or four port cow, still leaves room for further improvement.

What is needed in the art is a way to distill or fractionally distill contents in a more pure manner, which means finding a way to increase isolation of distillate fractions to be collected.

SUMMARY OF THE DISCLOSED TECHNOLOGY

A cold trap of embodiments of the disclosed technology includes a first interior space open at a top side and enclosed by side walls and a lower cone. A second interior space exterior to the lower cone has: i. a side wall which is continuous, at least in part, with the side wall of said first interior space, ii. a side entrance portal, iii. a lower portal opening in a direction substantially perpendicular to the side entrance portal. A third interior space is defined, at least in part, by the side wall of the second interior space and the side walls of the first interior space. This third interior space has: i. an additional side wall forming an exterior side of the third interior space, a lower portal in-line with the lower portal of the second interior space (vertically aligned, at least in part or in full), and iii. a side portal.

A vacuum suction is also used in embodiments of the disclosed technology. This vacuum pulls matter in the second interior space and the third interior space towards the side portal of the third interior space, this side portal being at the top of the device or near the top in embodiments of the disclosed technology. When vapor enters through the side entrance portal of the second interior space, it can remain there until said vapor condenses into liquid. The vapors cannot be pulled into the side portal of the third interior space because they are warmer and do not exit through the bottom portal until first condensing into a liquid, at which time they are too dense to be sucked upwards into the (upper) side portal of the third interior space in embodiments of the disclosed technology.

Thus, the liquid drops through the lower portal of the third interior space while the vacuum creates suction towards the side portal of the third interior space in embodiments of the disclosed technology. Matter pulled through the side portal of the third interior space is only dry air lacking substantially any water vapor, e.g. has a humidity equal to that of the ambient air or no more than 5% humidity more than the ambient air.

A liquid and/or solid material substantially fills the lower cone and at least a part of the first interior space above the lower cone in embodiments of the disclosed technology. It should be understood that the orientation matters in embodiments of the disclosed technology and "bottom" refers to towards the gravitational center of the Earth (or other body) and "top" refers to towards the sky and away from the gravitation center of the Earth (or other body).

The first interior space is sealed from each of the second interior space and third interior space (which are unsealed relative to each other) in embodiments of the disclosed technology. The side entrance portal into the second interior space is connected to a laminar flow distribution adapter in embodiments of the disclosed technology. Such a laminar flow distribution adapter has, at maximum, a minimum of no bend and a maximum of a slight bend in a flow path between an entrance portal and an exit portal thereof. The exit portal of the laminar flow distribution adapter is functionally connected, such that vapors flow there-through, to the side entrance portal of the second interior space in embodiments of the disclosed technology.

Described another way, a cold trap has a cooling section with a lateral entrance port leading into a conical wall. The conical wall is adapted or intended to be chilled during usage. Thus, vapors entering laterally hit and move around the conical wall, changing from a laminar to a vortex flow. The cooling section further has a bottom portal leading downwards between bottom-side walls. An evacuation section has side walls, exterior to, and surrounding the conical wall and the bottom-side walls of the cooling section. The evacuation section has a bottom portal vertically directly below the bottom portal of said cooling section.

The conical wall extends to, and forms a unitary piece, with a side wall of the cooling section in some embodiments of the disclosed technology. The side wall of the cooling section is continuous with a side wall of a cylindrical region, the cylindrical region having a top portal and a bottom end which substantially fully opens into a cone section, the cone section being defined by the conical wall. Interior space of the cylindrical region is substantially surrounded on all but a top side thereof by a combination of the side walls of the evacuation section and a side vacuum port in embodiments of the disclosed technology. The vacuum port extends into the evacuation section and connects a solid and unbending vacuum tube that has a curvilinear right angle bend thereto in embodiments of the disclosed technology.

A vacuum, in some embodiments, pulls in a direction such that gas is pulled through the cooling section, then through the evacuation section, and then through the vacuum port is used to pull dry gas out of the system while vapors of a distillate drop through the bottom portal of the evacuation section.

A method of using the cold trap can be carried out by adding liquid and/or solid below ambient temperature (such as 20, 30, 50 or more degrees Celsius below ambient temperature) into a receptacle whose bottom is the conical wall, wherein the lower conical section remains below the ambient temperature and/or substantially at the same temperature throughout the distillation. A vacuum pulls dry gas through the evacuation section and distillate vapors are received (simultaneously) into the cooling section in a laminar manner. The distillate vapors are cooled in the cooling section due to the liquid and/or solid below ambient temperature in the receptacle until the vapors condense into liquid and exit through each of the bottom portals of the cooling section and the evacuation section.

Described yet another way, a cold trap of embodiments of the disclosed technology has a substantially vertical side wall joined as one piece at the top but separates to form two interior spaces as one moves downwards. The first interior space is defined by an inner side wall (which forms a hollow cylindrical section and/or a hollow conical section which can be adjacent to each other and interconnected). The second interior space is also defined by the inner side wall, but also by an outer side wall such that it is between the inner and outer side walls. A bottom side of the inner side wall of the first interior space curves into a curvilinear inner bottom side wall with an inner bottom portal. The inner bottom portal opens between the first interior space and the second interior space. A bottom side of the outer side wall curves into a curvilinear outer bottom side wall with an outer bottom portal, the outer bottom portal vertically aligned with the inner bottom portal.

A conical wall can extend inwards from the inner side wall, the conical wall being within an area defined by the inner side wall and the inner bottom portal. A first lateral side portal which interrupts the outer side wall and the second interior space opens the first interior space to an outside of the cold trap. That is, the portal extends from the exterior of the device into the region defined by the first interior space. A second lateral side port, which interrupts the outer side wall, does likewise but into the second interior space. The second lateral side port is above the first lateral side port in some embodiments of the disclosed technology.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

The new technology described herein has a built-in "monocow". Monocow is a registered trademark, U.S. Pat. No. 5,390,629 having goods listed, at the time of this writing, as "Distillation apparatus for scientific purposes; Laboratory glassware". For purposes of this disclosure, "monocow" is defined as a distribution adapter with a single exit port for a condensed fraction. A distribution adapter is a device used to receive previously vaporized and now condensed (into liquid) distillate which has typically or has passed through a distillation head. A "distillation head" is defined as a device in which vapors of a solid, liquid, or combination solid and liquid product to be distilled move upwards therein before exiting into a distribution adapter.

In embodiments of the disclosed technology, a monocow is attached to a trap and the condensing vapors/liquid (herein, "distillate") is prevented from being pulled path the trap and into the vacuum. A "trap" is a device which holds, adjacent to but outside of the flow path of the distillate (condensing vapor or liquid being distilled), ice or another cold medium which causes turbulent flow and cooling of the distillate. For purposes of this disclosure "distillate" refers to and is defined as the vapor, liquid, or combination thereof which exits from the distillation head and is ultimately fractionally distilled into component parts, each component part having different physical properties such as a different boiling point.

Prior art traps or cold traps are typically glass bungs (stopper-type devices) which extends into another glass enclosure allowing a cold surface to condense warm vapors and protect vacuum systems. A drawback of prior art traps is that vapors move past the traps at too high a velocity to be significantly cooled thereby when, for example, the connections therein and there-out are increased to anything beyond a diameter of about ½ or ⅜ of an inch. When vapors continued past a trap, not only are the vapors lacking in proper separation into the collected fractions, but higher volume pumps are used.

In order to solve the problem of both the limitations of prior art pumps and prevent having multiple exit points for fractions of the fractionally distilled distillate, a laminar path monocow is used in embodiments of the disclosed technology.

Figure 1:
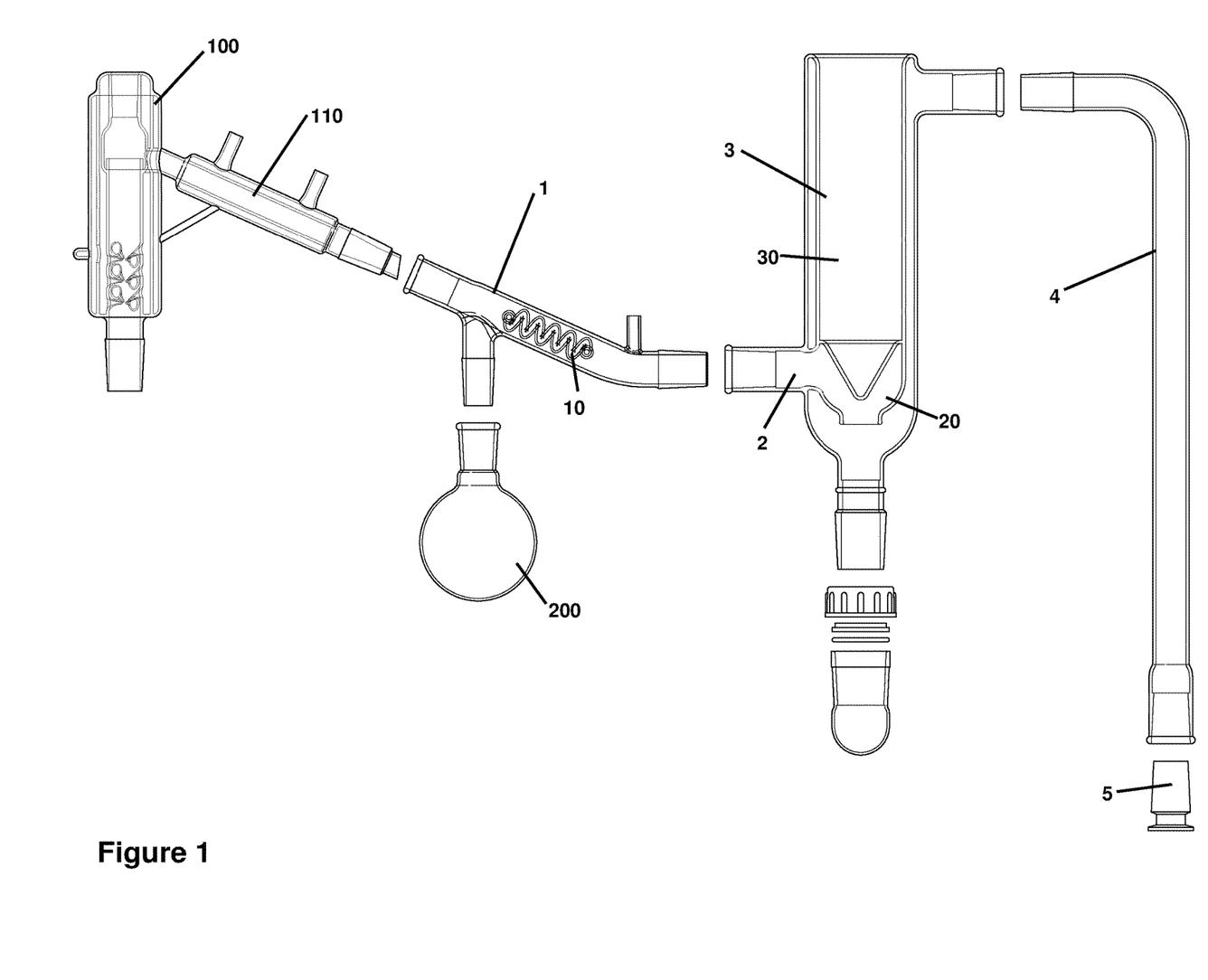
FIG. 1 shows a high level diagram of the distillation equipment used in embodiments of the disclosed technology.
Figure 2:
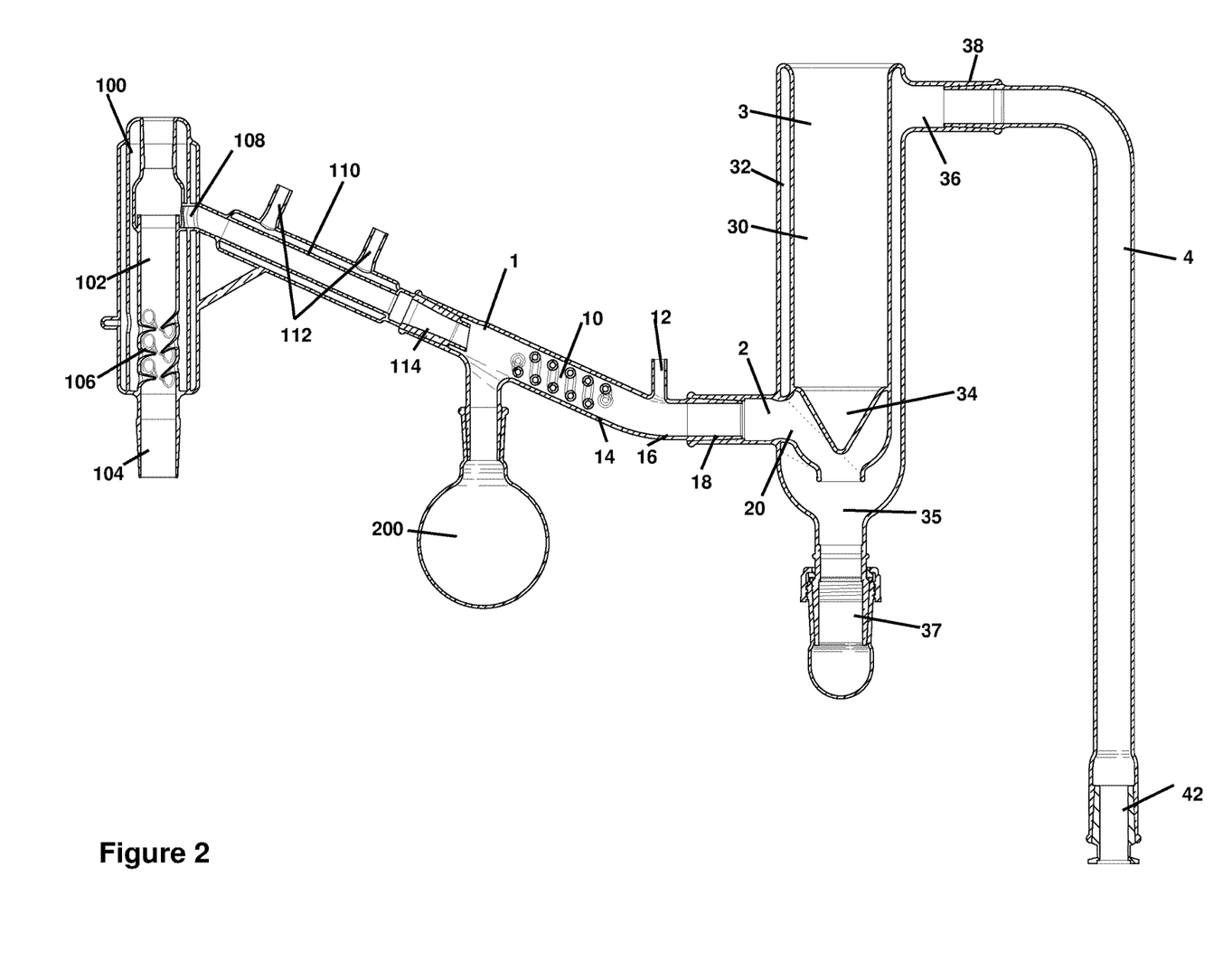
FIG. 2 shows a cutaway view of the distillation equipment of FIG. 1.
Figure 3:
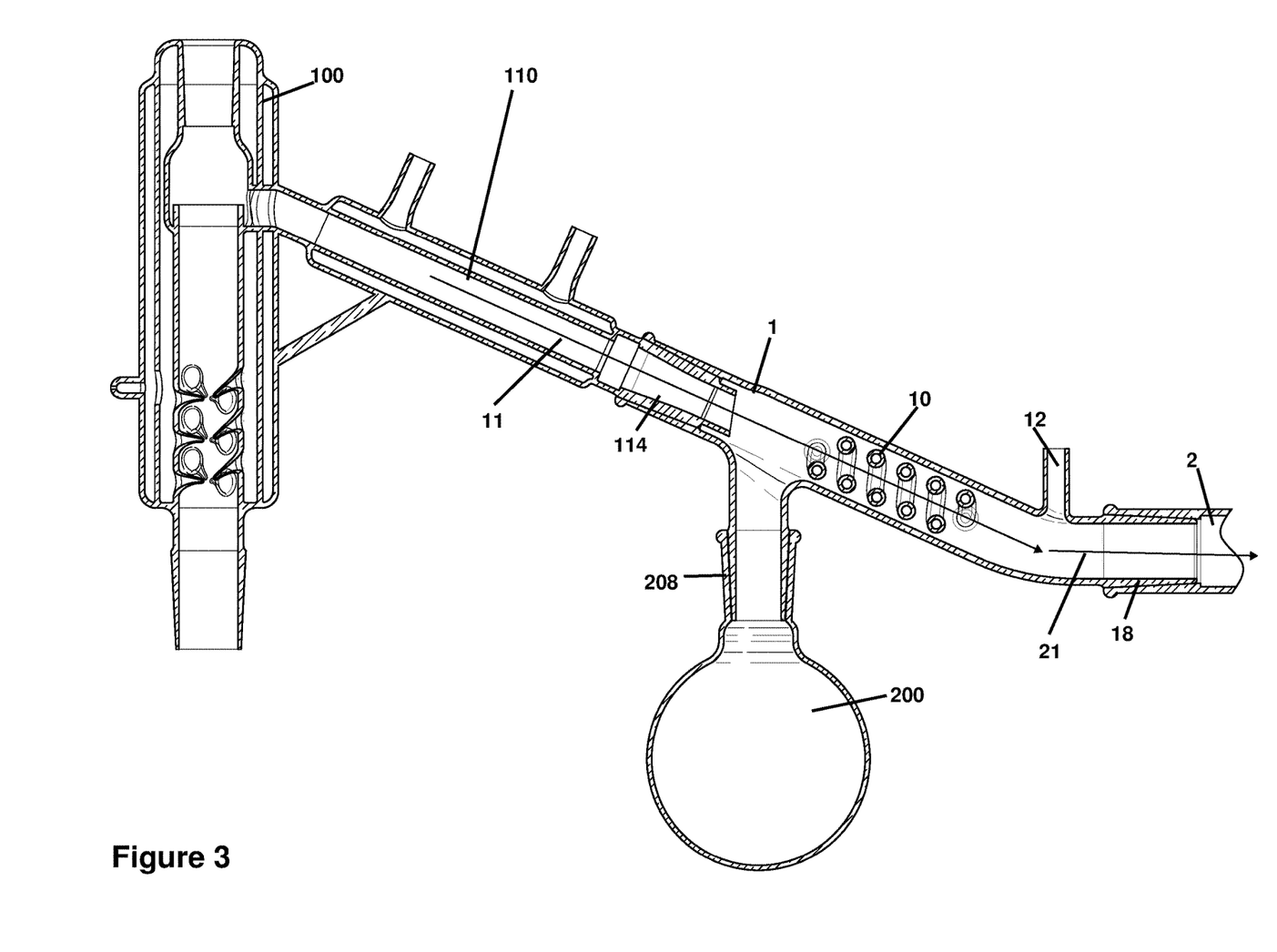
FIG. 3 shows a direction of flow through a distribution adapter into a dual stage cold trap used in embodiments of the disclosed technology.
Figure 4:
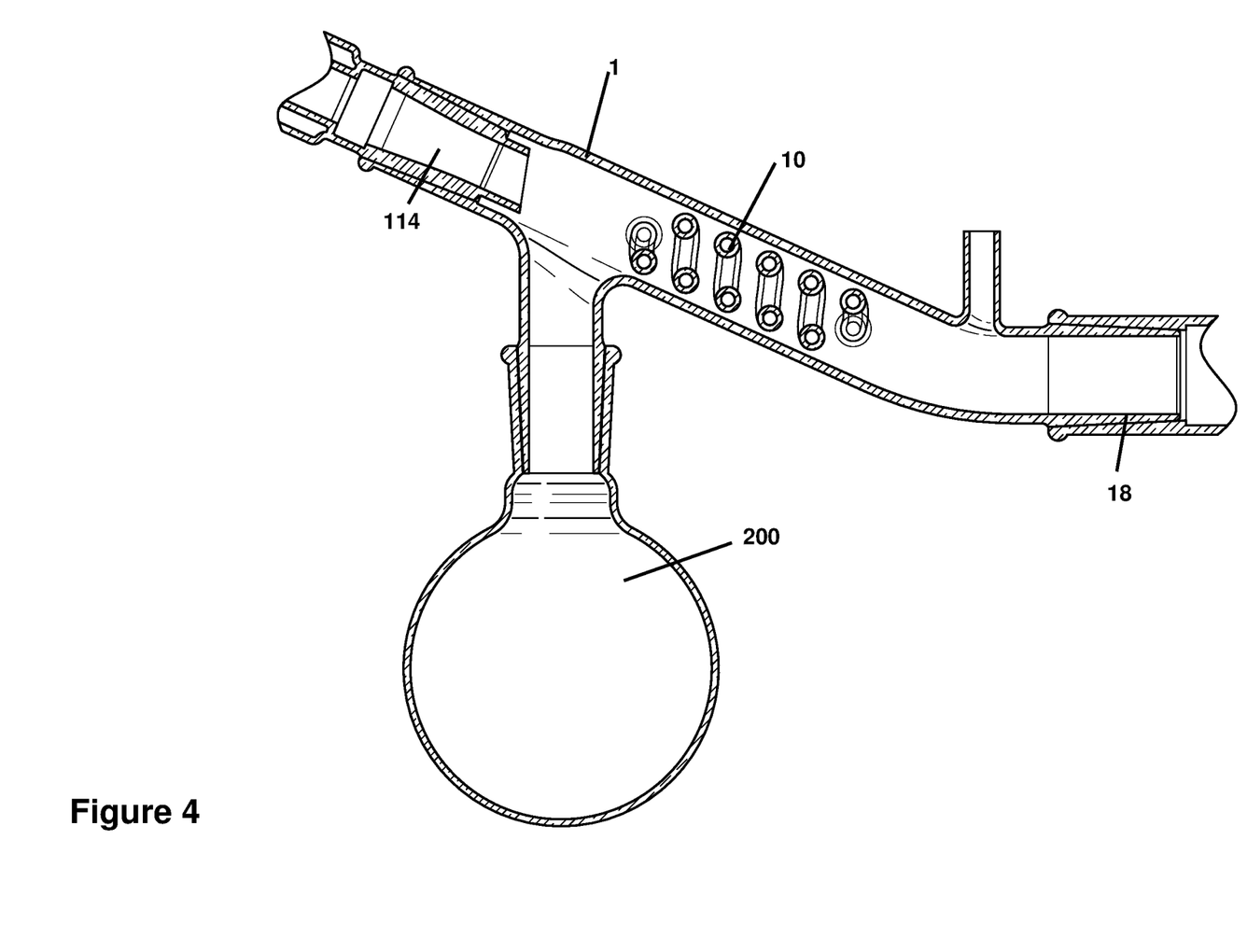
FIG. 4 shows a closer view of the laminar path distribution adapter in the system of embodiments of the disclosed technology.
Figure 5:
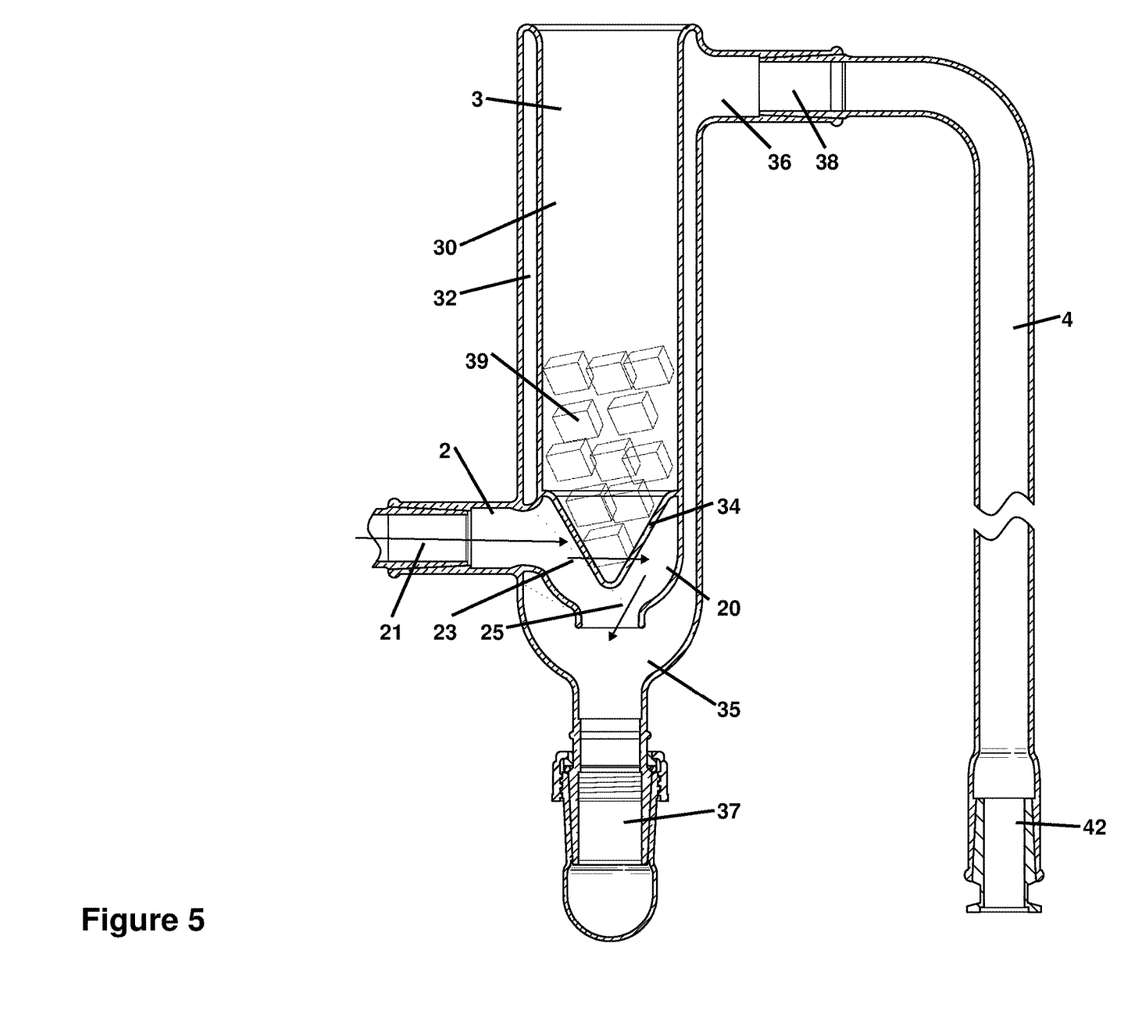
FIG. 5 shows a closer view of the cold trap in the system of embodiments of the disclosed technology.
Figure 6:
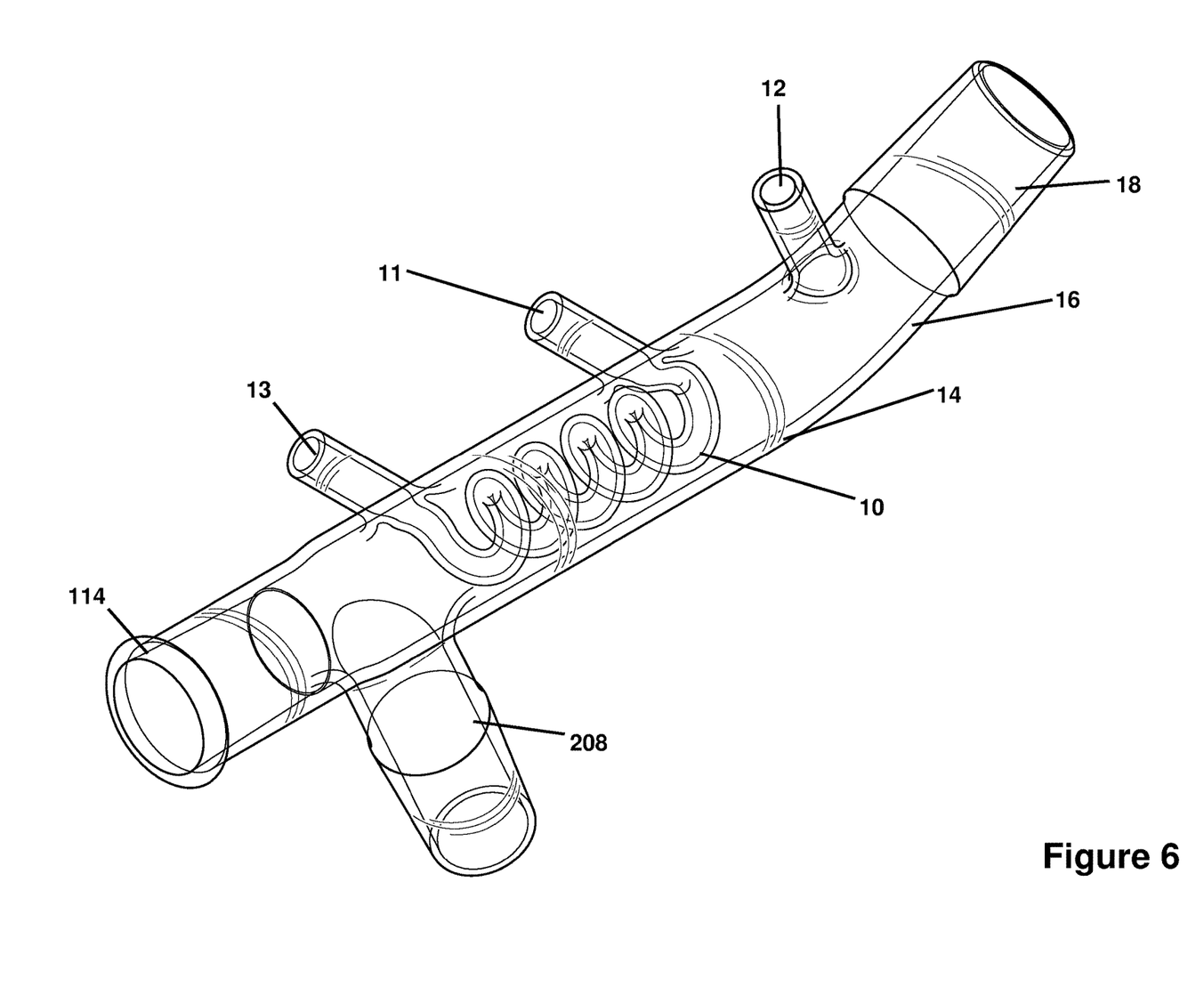
FIG. 6 shows a perspective view of the laminar path distribution adapter of embodiments of the disclosed technology.
Figure 7:
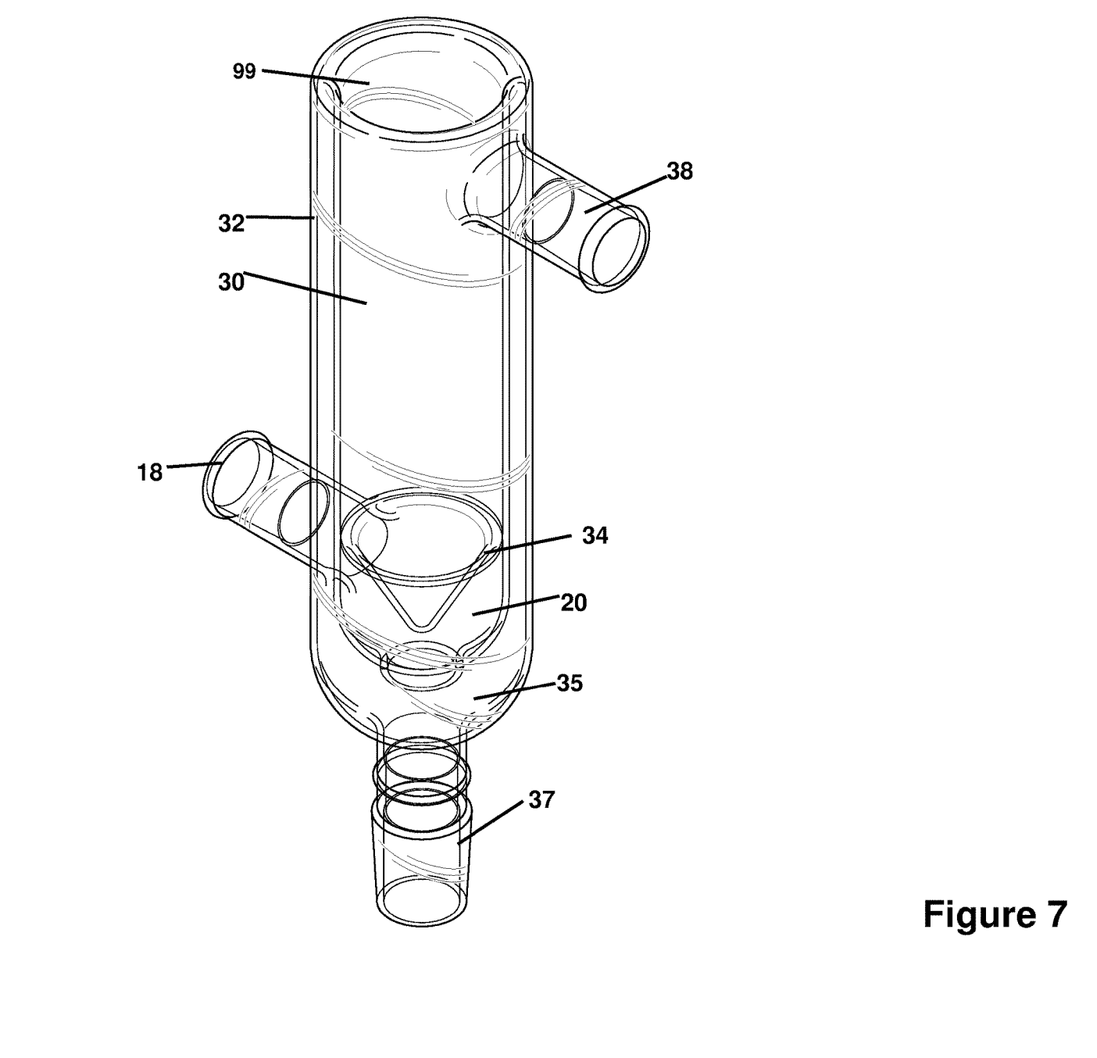
FIG. 7 shows a perspective view of the cold trap of embodiments of the disclosed technology.

The technology is best understood in view of the following discussion of the stages of distillation and figures. Discussing the figures simultaneously, FIG. 1 shows a high level diagram of the distillation equipment used in embodiments of the disclosed technology. FIG. 2 shows a cutaway view of the distillation equipment of FIG. 1. FIG. 3 shows a direction of flow through a laminar path monocow into a dual stage cold trap used in embodiments of the disclosed technology. FIG. 4 shows a closer view of the laminar path monocow used in embodiments of the disclosed technology. FIG. 5 shows a closer view of the dial stage cold trap used in embodiments of the disclosed technology. FIG. 6 shows a perspective view of the laminar path distribution adapter of embodiments of the disclosed technology. FIG. 7 shows a perspective view of the dual stage cold trap of embodiments of the disclosed technology.

The different areas of temperature 2 and 3 are thus one continuous unitary piece. The dry ice or mechanical cooling of the warmest part of the bung (the bung being the region enclosed by elements 30 and 34) causes the inverted cup region 34 to stay at substantially a same temperature as the rest of the bung. Combined with the cooling in stage 1, in this second stage the cooling is more effective than known in the prior art because the molecules are cooled a second time in stage 2 preventing wet or liquid molecules from condensing in stage 3 and more importantly, in stage 4. There is a prior art problem of water entering the vacuum apparatus such as through hoses to the vacuum. By way of the arm 4 with a right angle curve, in some embodiments, and the dual stage cooling this is prevented and distillation is purer and can continue longer uninterrupted than known in the prior art. The upper stage 3 portion stays near the temperature of the cooling material 39 placed therein. This is due to prevention of substantially all or all molecules rushing through the system without being cooled. For purposes of this disclosure, remaining "cold" or "at the same temperature" is within 5 degrees Celsius and "being cooled" refers to being cooled at least 20 degrees Celsius.

The disclosed trap was able to achieve during distillation with a full high cfm load at the lowest vacuum rating $2e$-$9$ with a dry unloaded glass rating of $5e$-$11$ using apiezon 501 grease and a digivac stratavac in testing. This trap not only offers a 3 stage inline cooling and vacuum protection feature but also was able to enhance vacuum depths on expensive diffusion setups without contamination of the vacuum pump or the pathway to the pump. More more amazing invention novel to the build out is the increased distillation speeds. This specific connection increased all industry distillation speeds 3× what they were with hoses. Where a distillation could occur at 1000 ml per hour in the prior art, the present trap exceeds 3000 ml per hour during standard usage. The simple loss of hoses and conversion to this 3 stage system allows for this increase in speed and vacuum protection.

The stages of distillation proceeds with fractional distillation using, for example, a vertical distillation chamber 100 which has a vertical pathway 102 for vapors to rise through and exit through a side portal 108. Pinched regions and/or Raschig rings 106 can be placed within the vertical chamber and the substance to be distilled can be placed in a flask or the like below a lower portal 104. The distillate then enters a condenser 110 which can be cooled by way of a water jacket with inlets 112. These elements 100 through 112 as well as element 200 are described further in both U.S. patent application Ser. No. 15/886,962 filed Feb. 2, 2018 and U.S. Pat. No. 9,895,626 where are hereby incorporated by reference in their entirety.

Once the distillate exits from the condenser through port 114 (the exiting end of the condenser which is placed, in embodiments of the disclosed technology, within the entrance tube of the distribution adapter 1/monocow), the distillate enters the distribution adapter 1. For purposes of this disclosure, an "entrance" or "entrance tube" it at an end of the system or a device which is more proximal to the the beginning of the distillation process. An "exit" or "exit tube" is at an end of the system or a device which is more proximal to the end of the entire system or a device. In general, the distillation proceeds from the lower port 104 (the "entrance") through the vertical distillation tube 102, out the exit portal 108, and in a direction from left to right through the system and devices shown in FIGS. 1 and 2.

At a high level, embodiments of the disclosed technology further the distillation through the distribution adapter 1, or monocow, with an entrance at 114 and exits 208 and 18. Exit 208 of the distribution adapter (which is entrance 208 of the flask 200) extends into a collection flask 200 where liquid discharge drains off and out of the system. However, downstream from the flask 200 is a coil 10 followed into a second temperature region 2, a lateral region comprising one or both of the end of the distribution adapter and beginning of a cold trap, and then a third temperature region 3 which is entirely in the cold trap. Thus, element 1 refers to both a temperature region and the distribution adapter and temperature region 3 refers to both a temperature region and the cold trap. Element 2 is a temperature region alone within the lateral sections and/or entrance/exits of elements 1 and 3. Temperature region 1 is, in embodiments of the disclosed technology, hotter than region 2 which is in turn hotter than region 3. Region 3 is filled with ice (from water) or in some embodiments, cooled or chilled liquid or solids.

Referring now to FIG. 6, the perspective view of the laminar path distribution adapter (monocow), in this view one can clearly see the coil 10. The flow path is from the portal 114 through the portal 18 past the coil 10 which cools, in the first cooling of the distillate product. There is no bend or only a slight bend at 16 to the exit portal 18 allowing for the laminar and non-turbulent flow. The coil can be filled with a cooling substance through portals 11 and 13, the cooling substance flowing there-through.

FIG. 7 shows a perspective view of the bung or inverted cup/cone chiller. Here, the chilling material (such as ice 39, shown in FIG. 5 with is representative of any solid chilling material) is placed through the upper portal 99 into the interior region 30 and 34, the interior regions forming a unitary space. An optical illusion makes the portal 18 look like it enters above the cone 34, but in actuality the entrance of distillate vapors is to beneath the cone 34 into the interstitial space 20. The liquid materials drop through the bottom exit portal 37 after being chilled in the interstitial space 20 while the vacuum pulls through the portal 38 and between the outer walls 32 and chilling bung 30/34. In this manner, no vapors can exit from region 20 into 35 and enter the vacuum. Vapors are "stuck" in region 20 once reaching this location and exit only when cooled to a liquid and dropping through to bottom exit portal 37.

Referring now specifically to FIGS. 3 and 5, note the pathway of the distillate. The vapors exit the condenser 110 in the direction 11 into the laminar path distribution head 1. Any liquid falls into the flask 200 while the vapors then continue along path 21 into (jump to FIG. 5) the cold trap. The laminar flow is now changed to a cyclic, vortex, or circular type flow 23 where the vapors condense due to the cold nature of lower conical/cone-shaped portion 43 of the trap which is maintained at a designated cold temperature due to the presence of chilling fluid and/or solid therein. The vapors then fall along path 25 (at an angle as shown or straight down), the liquid having mass causing the liquid to drip down through the bottom portal 37. All the while, a vacuum is pulling through element 4, the solid and non-bending vacuum apparatus, in embodiments of the disclosed technology. This vacuum extends through regions 38, 36, between 32/30, and into the space within the laminar path distribution adapter 1.

Now describing each section in more detail, the novelty of the technology should become more clear.

Element 1: Distribution Adapter (Laminar Path Monocow).

The distribution adapter 1 is a laminar path monocow. "Laminar path" is defined, for purposes of this disclosure, as passing there-through a device with a lack of vortexes or turbulent flow. That is, in the distribution adapter, the distillate which entered from the condenser 110 as a liquid falls away into the flask 200 by way of gravity. However, the vapor distillate continues with laminar flow (without turbulence or substantial change in direction) through to the exit port 18 of the distribution adapter. Note that the side walls of the distribution adapter 1 have no sharp turns (defined as "greater than 40 degrees") but rather only gradual turns (defined as "less than or equal to 40 degrees") or slight turns (defined as "less than or equal to 25 degrees"). Thus, the distribution adapter in embodiments of this technology handles both vapor and liquid in a single unit. The added port 12 is used for a vacuum port which can be at a top side of the device (where the flask 200 and lower port 104 represent a lower or bottom side of the system at their respective locations and a side opposite same is an upper or top side).

After the vapors are leaving the distillation head apparatus 100 the vapors are, in embodiments of the disclosed technology, at their hottest at port 108 at any time after leaving the distillation apparatus. While under vacuum, using a vacuum at port 12, there are still molecules rushing through a condenser and out of prior art systems. Thus, in the prior art, at least some molecules remain above a desired condensation temperature throughout the entire process of distillation. Some vapors which have molecules moving faster than can be cooled through the condenser or distillation head enter the cold trap at an elevated velocity (and temperature) which prematurely heats up the internal bung of any cold trap with warm vapors and prevents the trap from being as effective. What is desired, and what functions better than prior art systems here is that the cold trap 30 with lower cone 34 remains cold due to the greater pre-chilling of molecules through the path 1 and the beginning of 2 prior to contacting walls of the cold trap 30/34 or coming into a section immediately around or beneath the cone 34 of the cold trap 34. The cone of the cold trap is, in embodiments of the disclosed technology, a narrowing or cone-shaped (using the mathematical definition of "cone") section with a wider top side and narrower bottom side. The area "immediately around" same refers to the area defined by squaring off the cone if the narrowest portion where of equal area to the widest portion, as well as the area beneath the tip of the cone which is as wide as the widest part of the cone and lower than the lowest tip of the cone at a length of ¼ of the total height of the cone from top to bottom. Note that the "cone" for purposes of this disclosure has a top most region which meets with and has a continuous internal housing with a section of the cold trap 30 with a same width or at least as wide a width as the widest portion of the cone.

In this manner, the path of molecules form the portal 108 through the condenser 110 and into the distribution adapter 1 proceed without hoses or obstruction. Hoses of the prior art provided contamination with molecules piling along the glass surfaces and connectors. Here, there is an internal corkscrew chiller 10 which cools while at the same time there is laminar flow of the molecules of the distillate through the distribution adapter. The distillate passes around the corkscrew chiller 10 which can have any of cold water, acetone, alcohol, or the like. Temperatures of −80 to −100 Celsius can be reached with the chiller 10 or with the cold trap 30. (The cold trap 30 can also use dry ice or another solid.)

Dual Stage Cold Trap including: Element 2: Cone Trap and Element 3: Upper Trap

The dual stage cold trap or inverted cup cold trap has an inverted cup or cone 45 which is wider at the top and narrower at the bottom. The cone 45 joins with and shares a continuous internal space, in embodiments of the disclosed technology, with a larger storage area for cold material such as, as described above, dry ice, water ice, or the like. An external chilling apparatus can be used to cycle cold material into the space of elements 30 and 34 to keep the cone 34 and area immediately there-around 20 (and within the walls of the cold trap device) below a designated temperature.

The cone or inverted cup 34 prevents any high velocity vapors from entering the upper (coldest) part of the trap (numbered 3, where the vapors exit the trap through exit area 36 and the portal 38) and prevents heat from rising anywhere past the lower section (stage 2). This is the second cooling feature in this distillation cold trap path, the first being at the corkscrew chiller 10, in embodiments of the disclosed technology. The vapors in the path 2 thus rotated around the cone 34 forming a cyclone or cyclical path. This creates a molecular centrifugal force and throws heavy and light molecules along the sides/wall of the inverted cup 34. The cup wall now collects all super volatile and pre-cooled minor volatiles from stage 1 and allows them to simply drip down into the collection flask past the inverted cup in stage 2. Such super volatile and pre-cooled minor volatiles then pass into the lower vacuum area 35 of the cold trap and out through a bottom portal 37 as a solid in some embodiments of the disclosed technology.

The stage 3 area, which is roughly above the cone 34 within the traps outer walls 32, stays cold, relative to section 2, and dry, relative to section 2. This prevents warm or wet molecules or any or substantially any of the distillate from entering a vacuum pump are dropped through portal 37 of the cold trap. Given that the cone 34 is surrounded by interstitial space 20 which is in turn surrounded by the lower vacuum area 35 at the bottom side, the only energy input needed to separate the warm and wet molecules from the dry and cooler molecules in the cold trap is the cooling of the cold trap 30/34 itself. Thus, vapors are cooled entirely into liquids before the distillate, which is now a liquid, can exit from the region 20 to the region 35 where the mass prevents the liquid from being sucked into the vacuum and into the region between 30 and 32 or out the vacuum port 42. Liquids, rather, drop from 20 through 35 and out bottom exit port 37. The inverted cup or cone 34 is formed in unitary construction as one piece with the cold trap 30 and the outer walls 32 thereof in embodiments of the disclosed technology. Cooling energy from the bung itself (within the walls of the cold areas/cold trap 30 and 34) are transferred to the inverted cup much more efficiently than known in the prior art. This is monumental because the effect of Stage 2 cooling area is so effective the upper portions of the trap, in at least some uses of the system to distill a substance, lack passage of hotter (at the temperature of stage 1) or miscellaneous molecules into a vacuum pump.

Element 4: Arm Discharge Region

An arm 4, made out of glass in embodiments of the disclosed technology, engages out output port 38 of the cold trap which has a passage into the outer walls 36 of the cold trap 3. The output port of the cold trap/input port of the arm discharge region 38 is stainless steel in embodiments of the disclosed technology, such as the male end of the arm. The stainless steel variant has been verified with AVS (American Vacuum Society) standard to retain up to −10 scale vacuum along with the other joints. This also allows a full bore connection to the pumps without using hoses for passage of distillate/product there-through. It should be understood that any of the elements described or shown in the figures of this disclosure can be made from an inert glass, metal, or combination thereof.

Figure 8:
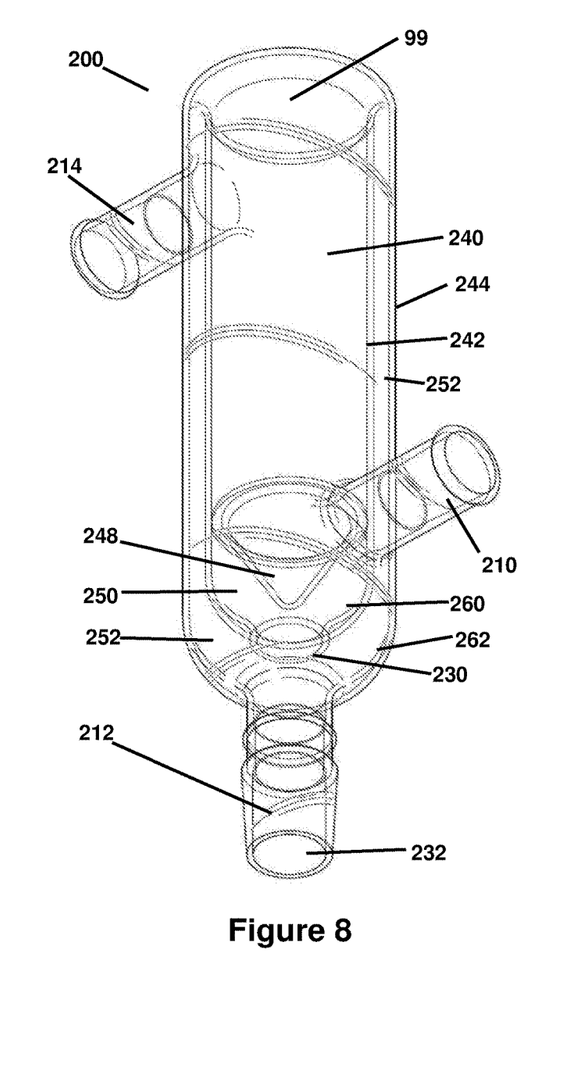
FIG. 8 shows a reverse and lower side perspective view of the cold trap of embodiments of the disclosed technology.
Figure 9:
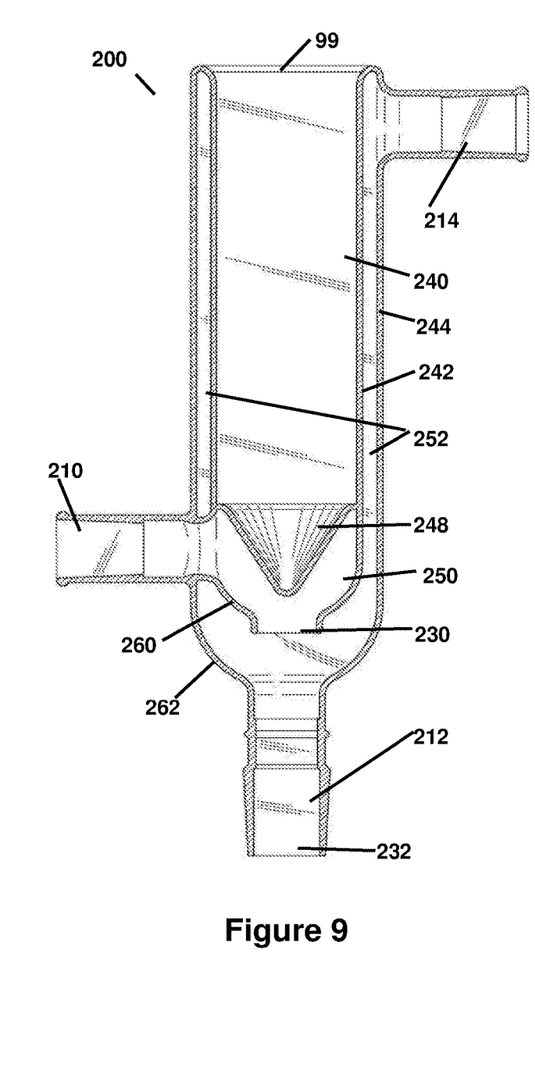
FIG. 9 shows a vertical cutaway view of the cold trap of embodiments of the disclosed technology.

FIG. 8 shows a reverse and lower side perspective view of the cold trap of embodiments of the disclosed technology. FIG. 9 shows a vertical cutaway view of the cold trap of embodiments of the disclosed technology. Though the cold trap 200 shown in these figures can be identical those in the earlier figures, they are shown here with different element numbers in order to emphasis other specific parts thereof. There are joined side walls 242 and 244 at the top which bifurcate to create an outer region or evacuation region 252. The inner side wall 242 extends downwards until having a curvilinear bottom side 260 while the outer side wall 244 extends downwards until having a curvilinear bottom side 262. Within the inner side wall is a cylindrical section 240 which joins together with a conical section 248. The cooling liquid/solid described above is placed herein through the top portal 99 in embodiments of the disclosed technology.

Through the side portal 210 vapors flow in in some embodiments of the disclosed technology. This vapors enter the cooling region 250 defined by the inner side walls 242 and conical section 248 (cone). The inner bottom walls 260 and bottom portal 240 also define the cooling section in some embodiments. Laminar flow of vapors through the portal 210 turns into a vortex or turbulent flow around the cone 248 which can be much cooler than the ambient temperature and/or the vapors. This causes the vapors to condense and fall through both portal 230 and 232 of the respective inner and outer side walls.

A vacuum can pull gas through the portal 214 such that there is flow of gas (e.g. air) from portal 210, through the region 250, then the region 252, and out the portal 214. However, the vapors are warmer and stay in the section 250 (do not fall into the evacuation section/region 252) until condensing into a liquid. As a liquid, the vacuum lacks the strength to pull same upwards through the section 252 which is further cooled by material within the space 240 which causes condensation of any vapors might make it there-in and fail to fall downwards through the bottom tube 212 and out the bottom portal 232.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A cold trap comprising:
    a first interior space open at a top side and enclosed by side walls and a lower cone;
    a second interior space exterior to said lower cone comprising:
        i. a side wall which is continuous, at least in part, with said side wall of said first interior space, and which circumscribes at least a portion of said lower cone;
        ii. a side entrance portal; and
        iii. a lower portal opening in a direction substantially perpendicular to said side entrance portal;
    a third interior space defined at least in part by said side wall of said second interior space and said side walls of said first interior space, comprising:
        i. an additional side wall forming an exterior side of said third interior space, said additional side wall circumscribing at least part of said side walls of said first interior space and said side wall of said second interior space;
        ii. a lower portal in-line with said lower portal of said second interior space; and
        iii. a side portal.

2. The cold trap of claim 1, further comprising a liquid and/or solid material substantially filling said lower cone and at least a part of said first interior space above said lower cone.

3. The cold trap of claim 2, wherein said first interior space is sealed from said second interior space and said third interior space.

4. A cold trap comprising:
    a cooling section having a lateral entrance port leading into a conical wall adapted or intended to be chilled during usage such that a laminar flow converts to a turbulent flow through said cooling section, said cooling section further having a bottom portal leading downwards between bottom-side walls, said bottom side walls at least partially circumscribing said conical wall;
    an evacuation section having side walls exterior to and surrounding said conical wall and said bottom-side walls of said cooling section;
    wherein said evacuation section comprises a bottom portal vertically directly below said bottom portal of said cooling section.

5. The cold trap of claim 4, wherein said conical wall extends to, and forms a unitary piece, with a side wall of said cooling section.

6. The cold trap of claim 5, wherein said side wall of said cooling section is continuous with a side wall of a cylindrical region, said cylindrical region having a top portal and further having a bottom end which substantially fully opens into a cone section, said cone section being defined by said conical wall.

7. The cold trap of claim 6, wherein said interior space of said cylindrical region is substantially surrounded on all but a top side thereof by a combination of said side walls of said evacuation section and a side vacuum port.

8. The cold trap of claim 7, wherein said vacuum port extends into said evacuation section and connects a solid and unbending vacuum tube with a curvilinear right angle bend thereto.

9. The cold trap of claim 7, further comprising a vacuum pulling in a direction from said cooling section, through said evacuation section, and through said vacuum port, said vacuum pulling dry gas only while vapors of a distillate drop through said bottom portal of said evacuation section.

10. A method of using the cold trap of claim 4, comprising the steps of:
adding liquid and/or solid below ambient temperature into a receptacle whose bottom is said conical wall, wherein said lower conical section remains below said ambient temperature throughout said distillation;
engaging a vacuum pulling dry gas through said evacuation section;
receiving distillate vapors laminarly into said cooling section;
cooling said distillate vapors in said cooling section due to said liquid and/or solid below ambient temperature in said receptacle, until said vapors condense into liquid and exit through said bottom portal of said cooling section and said evacuation section.

11. A cold trap comprising:
a substantially vertical side wall joined as one piece at the top which separates to form two interior spaces;
said first interior space of said two interior spaces defined by an inner side wall;
said second interior space of said two interior spaces defined by said inner side wall and an outer side wall, said outer side wall circumscribing said inner side wall;
a bottom side of said inner side wall of said first interior space curving into a curvilinear inner bottom side wall with an inner bottom portal, said inner bottom portal opening between said first interior space and said second interior space;
a bottom side of said outer side wall curving into a curvilinear outer bottom side wall, said outer bottom side wall having an outer bottom portal, said outer bottom portal vertically aligned with said inner bottom portal.

12. The cold trap of claim 11, further comprising a conical wall extending inwards from said inner side wall, said conical wall being within an area defined by said inner side wall and said inner bottom portal.

13. The cold trap of claim 12, further comprising a first lateral side portal which interrupts said outer side wall and said second interior space, opening said first interior space to an outside of said cold trap.

14. The cold trap of claim 13, further comprising a second lateral side port which interrupts said outer side wall, opening said second interior space to said outside of said cold trap.

15. The cold trap of claim 1, wherein said lower portal of said third interior space is disposed downstream of said lower portal of said second interior space.

* * * * *